United States Patent [19]

Alesz et al.

[11] Patent Number: 5,627,326

[45] Date of Patent: May 6, 1997

[54] CORIOLIS TYPE APPARATUS FOR MEASURING MASS FLOW OF A FLUID STREAM

[75] Inventors: József Alesz; Imre Busznyák; István Glódi; András Kiss; Józsefné Kukta, all of Budapest; Béla Nagy, Budakeszi; Péter Salamon, Budapest; Elemér Szentpéteri, Budapest; Zoltán Tóth, Budapest; Tamás Ujhelyi, Budapest, all of Hungary

[73] Assignee: MMG Automatika Muvek Reszvenytarsasag, Hungary

[21] Appl. No.: 318,841

[22] PCT Filed: Apr. 26, 1993

[86] PCT No.: PCT/HU93/00026

§ 371 Date: Feb. 6, 1995

§ 102(e) Date: Feb. 6, 1995

[87] PCT Pub. No.: WO93/22629

PCT Pub. Date: Nov. 4, 1993

[30] Foreign Application Priority Data

Apr. 24, 1992 [HU] Hungary .......... PATP 9201369

[51] Int. Cl.$^6$ .................................................. G01F 1/84
[52] U.S. Cl. ............................................. 73/861.357
[58] Field of Search ........................ 73/861.37, 861.38

[56] References Cited

U.S. PATENT DOCUMENTS

| 4,192,184 | 3/1980 | Cox et al. ............... 73/194 B |
| 4,286,471 | 9/1981 | Lee et al. ................ 73/861.84 |
| 4,422,338 | 12/1983 | Smith .................... 73/861.38 |
| 4,605,281 | 8/1986 | Lee et al. .................. 73/195 |
| 4,655,089 | 4/1987 | Kappelt et al. . |
| 4,680,974 | 7/1987 | Simonsen et al. ........... 73/861.38 |
| 4,996,871 | 3/1991 | Romano . |
| 5,024,104 | 6/1991 | Dames . |
| 5,050,439 | 9/1991 | Thompson ................. 73/861.38 |
| 5,052,231 | 10/1991 | Christ et al. . |
| 5,069,074 | 12/1991 | Young et al. . |

FOREIGN PATENT DOCUMENTS

| 212782A | 5/1986 | European Pat. Off. ........ G01F 1/84 |
| 200234A | 8/1988 | Hungary ................ G01F 1/76 |
| 001759A | 7/1978 | United Kingdom ........ G01P 5/02 |
| 234591A | 12/1990 | United Kingdom ........ G01F 1/84 |
| 9300026 | 11/1993 | WIPO .................. G01F 1/84 |

OTHER PUBLICATIONS

PCT International Application Published as Int'l Publication No. WO 93/22629 (Application No. PCT/HU93/00026) published Nov. 11, 1993.
International Search Report dated Aug. 23, 1993 in the above PCT Application No. PCT/HU93/00026.

*Primary Examiner*—Richard Chilcot
*Assistant Examiner*—Jewel V. Artis
*Attorney, Agent, or Firm*—Fitch, Even, Tabin & Flannery

[57] ABSTRACT

A Coriolis type apparatus for measuring mass flow of a fluid stream, comprising at least one flow conduit which is oscillated at a resonant frequency transverse to the direction of flow while said fluid flows therethrough, two sensors for generating analog signals corresponding to the motion of the flow conduit, and signal processing means for determining time difference between said analog signal, said signal processing means including means for converting said analog signals into series of digital signals and means to compute from said series of digital signals said time difference by using Fourier transformation. Each of the analog signals generated by the sensors is converted into a series of digital signals by an incremental type analog-digital converter having a comparator, an up-down counter and a digital-analog converter.

4 Claims, 3 Drawing Sheets

1

CORIOLIS TYPE APPARATUS FOR MEASURING MASS FLOW OF A FLUID STREAM

TECHNICAL FIELD

The invention relates to a Coriolis type apparatus for measuring mass flow of a fluid stream, comprising at least one flow conduit which is oscillated at a resonant frequency transverse to the direction of flow while said fluid flows therethrough.

BACKGROUND ART

Mass flow measuring apparatus utilizing the effect of Coriolis force are based on the physical phenomenon, that Coriolis force acts on a conduit if it is vibrated perpendicular to the direction of flow through the conduit. The magnitude of the Coriolis force depends on the angular velocity of the vibration and the mass flow. The Coriolis force is a periodic force with a frequency equal to the frequency of vibration. As a consequence, a phase difference (time lag) in motion is obtained if a conduit fixed at two points is vibrated at its centre between the two supports and the motion is measured by sensing devices at two points located symmetrically at both sides of the centre, which results from the superposition of the vibrating force and the Coriolis force and is proportional to the mass flow. Signal processing units of mass flow meters calculate the mass flow on the basis of signals of sensing devices located symmetrically. The design and operating characteristics of Coriolis mass flow meters; are closely related to the conduit assembly used.

The mass flow information is always carried by the component caused by the Coriolis force in the electric signal supplied by the sensing devices that are located symmetrically to the centre of the conduit. The signal processing units measure either this specific component or another parameter traceable to this. Such parameters are e.g. time lag between the two signals, the integral formed from the absolute values of signal differences for a finite number of full periods etc.

Signal processing units of this kind are described in British Patent No. 2,171,200, U.S. Pat. No. 4,879,911, Hungarian Patent No. 200,234, International Patent Application No. WO 88/03261 and U.S. Pat. Nos. 4,655,089 and 4,996,871.

The apparatus described in the British Patent No. 2,171,200 is connected to a conduit assembly having a pair of straight conduits parallel to each other. The effect of the interfering longitudinal (axial) stresses generated during the vibration of the straight conduit sections are eliminated by generating the vibration at the fundamental resonant frequency and its third harmonic frequency simultaneously, while utilizing the property of the pair of parallel conduits that the ratio of the fundamental frequency to its third harmonic carries information about the axial stresses. In a first approach, the mass flow will be determined on the basis of the phase difference obtained at the fundamental frequency and, then, the result thus obtained will be corrected taking the measured ratio of the fundamental frequency to its third harmonic into account.

The apparatus described in U.S. Pat. No. 4,879,911 reduces the measuring task to the measurement of time difference. By analog integration of the signals of the sensing devices a reference signal and a measuring signal proportional to the displacement will be obtained. By comparing these signals with zero-symmetric reference voltages, gate-times are obtained, that contain the time lag between the signals with various signs. By summing the gate times with proper signs, the time lag between the signals will be obtained, which is proportional to the mass flow.

The apparatus described in Hungarian Patent No. 200,234 uses the integral value of the signals of the sensing devices to calculate the mass flow.

By adding the frequency component associated with the deformation caused by the Coriolis force to the driving signal, the effect of Coriolis force will be significantly increased. This is utilized by the apparatus described in International Patent Application No. WO 88/03261, in which four independent driving and sensing elements are used. The signal caused by the Coriolis force and the driving signal, contained in the complex input signals, are separated by means of synchronous rectifiers and the mass flow is calculated on the basis of the ratio of these two component signals.

The apparatus described in U.S. Pat. No. 4,655,089 uses an integrator with coupled capacitors to generate signals proportional to the displacement. The signals thus obtained will be fed to a voltage comparator each of variable reference, which control a phase comparator. The phase comparator sets the output voltages of digital-analog converters through a digital counter so as to obtain zero (or constant) time delay at the input of the phase comparator while using the said output voltages as references to the said voltage comparators. In the equilibrium once obtained, the difference between the control codes of digital-analog converters will be proportional to the mass flow.

In U.S. Pat. No. 4,996,871 a Coriolis densimeter is described which relies on measuring mass flow rate by determining the phase difference that occurs between real and imaginary components of the discrete Fourier transformation of signals of two velocity sensors attached to the conduits vibrated. The analog signals of the sensors are multiplexed, filtered with an anti-aliasing low pass filter, then subject to a sample and hold function and digitalized in order to performe the discrete Fourier transformation. Alternatively, a separate low pass filter could be situated in front of the multiplexer for each of the two incoming velocity signals in lieu of the anti-aliasing filter. Unfortunately, the use of such filters may result in measurements error as their characteristics vary due to temperature variations and thereby influencing the phases of the signal to be measured. Moreover, in the apparatus described the samples of the two signals are interleaved, i.e. they cannot be sampled at the same time. This phase shift has to be compensated which is rather complicated and represents a further source of measurement error.

DISCLOSURE OF THE INVENTION

It is an object of the present invention to provide an improved Coriolis type mass flow meter using Fourier transformation for determining the mass flow rate.

Hence, the invention is a Coriolis type apparatus for measuring mass flow of a fluid stream, comprising at least one flow conduit which is oscillated at a resonant frequency transverse to the direction of flow while said fluid flows therethrough, two sensors for generating analog signals corresponding to the motion of the flow conduit, and signal processing means for determining time difference between said analog signals, said signal processing means including means for converting said analog signals into series of digital signals and means to compute from said series of digital signals said time difference by using Fourier transformation. According to the invention each of the analog signals generated by the sensors is converted into a series of digital signals by an incremental type analog-digital converter having a comparator, an up-down counter and a digital-analog converter, the up-down counter of both analog-digital converters are driven by a common clock signal source, and said series of digital signals are forwarded to the computing means from outputs of the up-down counters through controlled latches.

The incremental type analog-digital converters used in the apparatus according to the invention obviate the use of analog filters as described in the cited prior art. Further, the frequency characteristics of an incremental type analog-digital converter can easily be set by adjusting the frequency of the clock signal.

It is a further advantage of the apparatus according to the invention that both analog signals generated by the sensors can be sampled in the same time.

An embodiment of the apparatus according to the invention is characterized in that for generating the control signal for the latches it comprises a reference oscillator including a comparator having an input connected to one of said analog signals, a phase detector, a low pass filter and a voltage controlled oscillator connected in series, and a binary divider driven by the voltage controlled oscillator and having an output connected to an input of the phase detector. With this arrangement the frequency of the signal controlling the latches can easily be set to an integral multiple, e.g. 16-times, of said resonant frequency.

According to a further aspect of the invention each of the incremental type analog-digital converters is designed so that $LSB/T \geq 2 \cdot \sqrt{2} \cdot \pi \cdot U \cdot f$, where LSB is the least significant bit of the up-down counter, T is the time period of the clock signal, U is the r.m.s. value of the greater one of said analog signals, and f is the frequency of said analog signal.

The apparatus according to invention comprises vibrating means to oscillate the flow conduits and it is advantageous if the vibrating means are driven by a signal which is in phase of the sum of said analog signals generated by the sensors.

Further advantages of the invention will become apparent by particularly pointing out preferred embodiments of the invention. For the purpose of illustrating the invention, there is shown in the drawings a form which is presently preferred; it being understood, however, that the invention is not limited to the embodiments shown.

MODES FOR CARRYING OUT THE INVENTION

Figure 1:
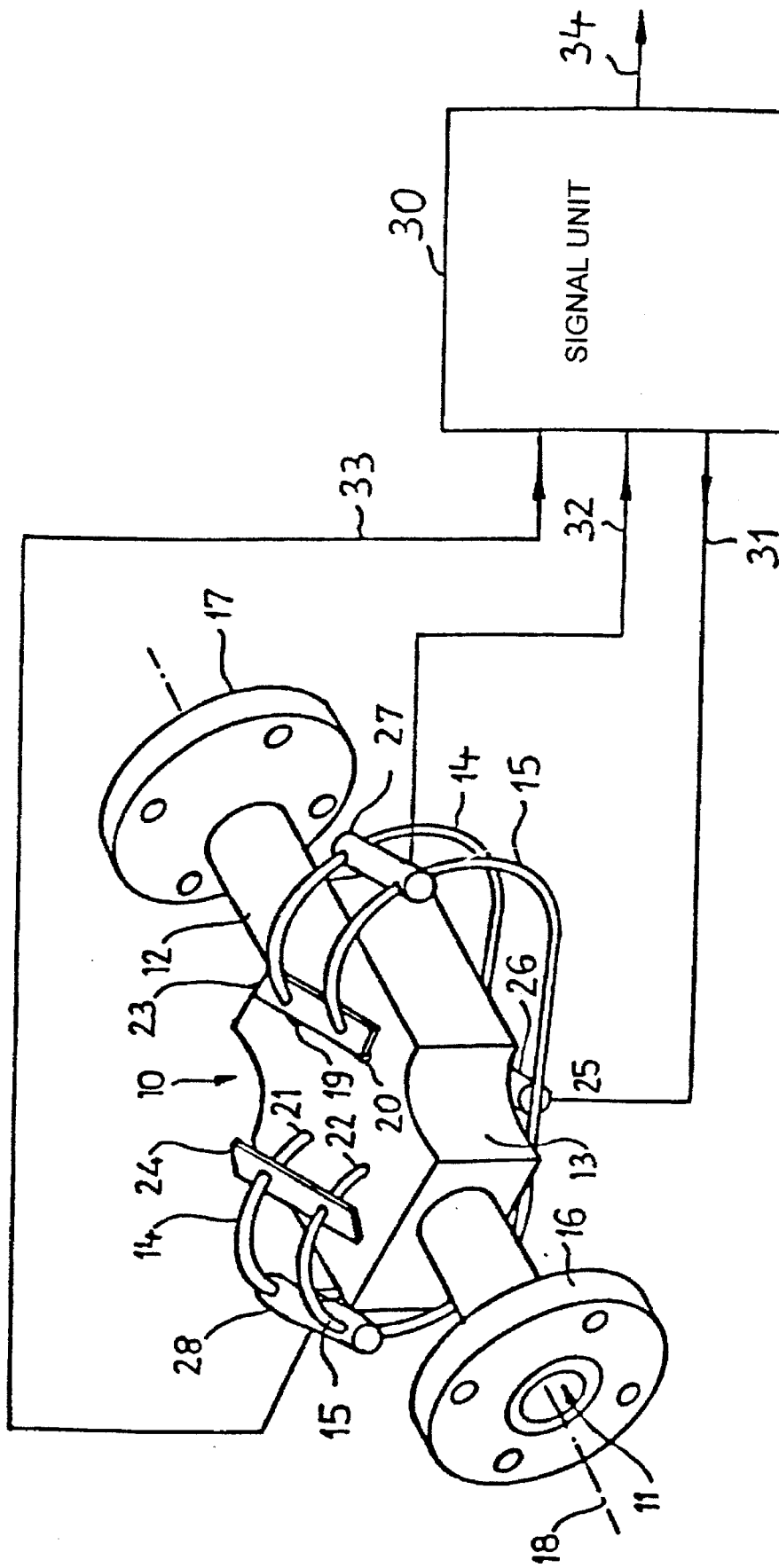
FIG. 1 shows an overall diagram of the Coriolis type apparatus according to the invention comprising a perspective view of the conduit assembly and a simplified block diagram of the signal unit.

In the drawings like reference numbers indicate like elements.

FIG. 1 shows an embodiment of a mass flow metering apparatus according to the invention which includes a conduit assembly 10 and a signal unit 30. The conduit assembly 10 as shown includes an inlet part 11, an outlet part 12, a central mounting block 13 and two generally B-shaped flow conduits 14 and 15. The inlet part 11 and the outlet part 12 includes flanges 16 and 17, respectively, which are formed in anticipation of mounting the conduit assembly 10 within a defined fluid stream of pipeline (not shown). The inlet part 11 and the outlet part 12 generally define an inlet and outlet to the flow conduits 14, 15 from the fluid stream and preferably positioned coaxially with respect to one another as well as coaxial with the longitudinal axis 18 of the fluid stream to be measured.

The mounting block 13 generally forms an inlet channel (not shown), which communicates with the inlet part 11, and an outlet channel (not shown), which communicates with the outlet part 12. The inlet channel generally forms a flow splitter to divide the fluid flow passing through the mounting block 13 so as to feed substantially equivalent portions of the flow from the inlet part 11 into each of the two flow conduits 14, 15. The flow passes through the two flow conduits 14, 15 in a substantially simultaneous and parallel relationship. A single exhaust flow is formed at a flow converger in the outlet channel and is directed into the outlet part 12.

The flow conduit 14 has an inlet end 19 and an outlet end 21 which are fixedly attached to the mounting block 13. Similarly, inlet end 20 and outlet end 22 of the flow conduit 15 are fixedly attached to the mounting block 13. The two flow conduits 14 and 15 are fixed to each other by two brackets 23 and 24 adjacent the respective mounting ends 19, 20 and 21, 22.

A vibrator 25 is mounted to a position between the two substantially straight portions of the flow conduits 14 and 15 by means of an arm 26 in order to oscillate the flow conduits 14 and 15 in an opposite phase with respect to each other. Sensors 27 and 28 are positioned on arcuate portions of the flow conduits 14 and 15 so as to measure the motion of the flow conduits 14 and 15 with respect to one another. The vibrator 25 and the sensors 27, 28 may take any desired form as known in the art.

The signal unit 30 determines mass flow through the flow conduits 14, 15 as a result of analog signals received from the sensors 27 and 28 via leads 32 and 33, respectively. Further, the signal unit 30 generates a driving signal on lead 31 for the vibrator 25. The signal unit 30 delivers a mass flow rate signal on its output 34.

Clearly, those skilled in the art recognize that, although the disclosed embodiment of the conduit assembly utilizes generally B-shaped flow conduits, one flow conduit or more flow conduits of almost any size and shape may be used as long as the conduit or conduits can be oscillated about an axis transversal to the fluid stream within the conduit.

Figure 2:
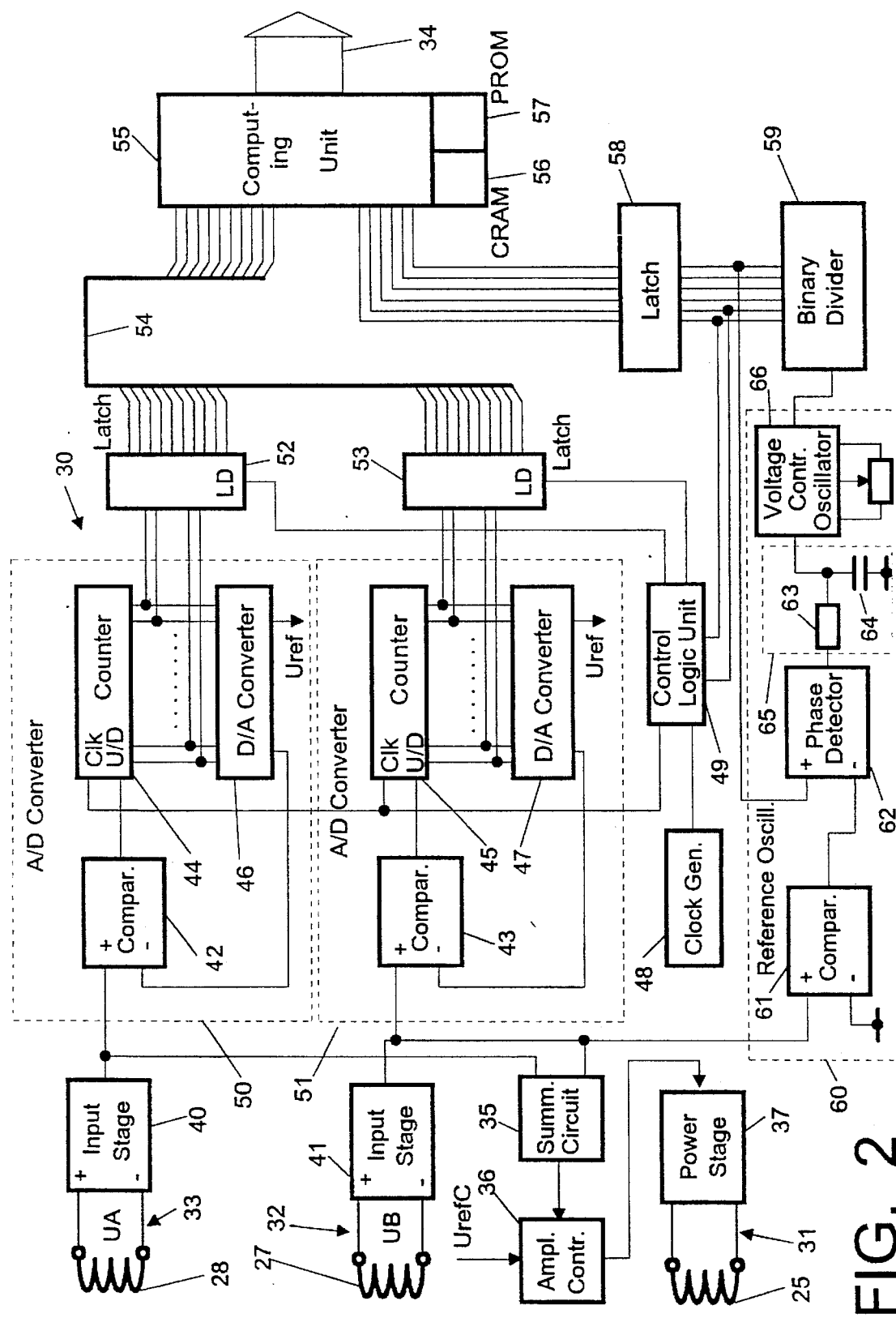
FIG. 2 is a block diagram of an embodiment of the signal unit as shown in FIG. 1.

FIG. 2 shows a block diagram of the signal unit 30. The analog signals UA and UB from the sensors 28 and 27, respectively, will be fed to input stages 40 and 41, respectively. The input stages 40, 41 amplify the analog signals to a level of about 5 V r.m.s. The amplified analog signal at the output of the input stage 40 is fed to the input of the an incremental type analog-digital converter 50 the output of which is connected to a controlled latch 52. The analog-digital converter 50 includes an input comparator 42, an up-down counter 44 and a digital-analog converter 46 supplied the same reference voltage Uref. Similarly, another incremental type analog-digital converter 51 is connected to the output of the input stage 41, and the output of this converter 51 is connected to another controled latch 53. The analog-digital converter 51 includes an input comparator 43, an up-down counter 45 and a digital-analog converter 47 supplied by a reference voltage Uref. The operation of the analog-digital converters 50 and 51 will be explained by reference to the analog-digital converter 50, only.

The signal from the input stage 40 will be fed to the "+" input of the comparator 42 which, in turn, controls the Up/Down input of the up-down counter 44. The output code of this counter 44 sets the output voltage of the digital-analog converter 46. This output voltage will be fed to the "−" input of the comparator 42. The comparator 42 compares the two voltages at its inputs and controls the Up/Down input of the counter 44 so as to make the output voltage of the digital-analog converter 46 equal to the output signal from the input stage 40 at any time. The clock signal necessary for the operation of the counter 44 will be supplied by a clock generator 48 through a control logic unit 49. The frequency of the clock generator 48 can be determined from the zero transition slope of the output signal from the input stages 40, 41 and the minimum voltage change (LSB) of the analog-digital converters 50, 51. Each of the incremental type analog-digital converters 50 and 51 is designed so that $$LSB/T \geq 2 \cdot \sqrt{2} \cdot \pi \cdot U \cdot f,$$

where LSB is the least significant bit of the up-down counter, T is the time period of the clock signal, U is the r.m.s. value of the greater one of said analog signals, and f is the frequency of the analog signal, i.e. the resonant frequency of the flow conduits 14, 15. Preferably, the value of LSB/T is only slightly greater than $2 \cdot \sqrt{2} \cdot \pi \cdot U \cdot f$.

The output code of the analog-digital converter 50 is stored in the latch 52. The sampling is performed by writing the output code to the latch 52 at appropriate times. In this circuit an analog sample and hold circuit is not necessary. The measuring times and the phase states are stored in a 6-bit latch 58. The control logic unit 49 controls the load input of the latches 52, 53 taking the phase of the reference oscillator 60 into consideration. A computing unit 55, provided with CRAM 56 and PROM 57, is connected to the latches 52, 53 via bus 54. The computing unit 55 performs the reading of the content of the latches 52, 53 as well as the calculations according to Fourier transformation described below.

For sampling the amplified signals there is a reference oscillator 60 including, in series, a zero level comparator 61 having an input connected to one of the amplified signals, a phase detector 62, a low pass filter 65 having a resistor 63 and a capacitor 64, and a voltage controlled oscillator 66. The output of the voltage controlled oscillator 66 is connected to the input of a binary divider 59 having six outputs. The output of the most significant bit is connected to another input of the phase detector 62.

The output frequency of the reference oscillator 60 shall be set to a value that is an integer multiple of the frequency of the analog signals UA and UB. It is recommended to set the frequency of the reference oscillator 60 to a value equal to four times the sampling frequency, as in this case the control signals that will be needed for signal processing will also be available. The sampling frequency may be equal to 16-times the frequency of the analog signals UA and UB. This control is performed by the zero level comparator 61, the phase detector 62 and the low pass filter 65. The zero level comparator 61 is connected to the output of the input stage 41. The most important element of the control circuit is the phase detector 62, the "−" input of which receives the output signal from the zero level comparator 61, while the "+" input receives the signal from the voltage controlled oscillator 66 subdivided according to the powers of 2 by the binary divider 59. Based on the signals fed to its input, the phase detector 62 determines the phases of the two signals and issues a charge of proper sign to the low pass filter 65 for the time proportional to the phase difference. The low pass filter 65 will convert the charge into voltage and stores it until the next comparison. The output of the phase detector 62 is in a high-impedance state until a new comparison takes place. The voltage from the low pass filter 65 controls the voltage-controlled oscillator 66 which, in turn, sets the sampling times by means of the binary divider 59.

In FIG. 2 a preferred embodiment for the driving circuite of the vibrator 25 is also shown by which the distortion due to the Coriolis forces are eliminated. The analog signal UA is fed through the input stage 40 to one of the inputs of a summing circuit 35, while the analog signal UB through the input stage 41 to the other input of the summing circuit 35. The output signal of the summing device 35 is connected to one input of an amplitude controller 36, while its other input receives a reference signal UrefC of appropriate value. The amplitude controller 36 amplifies (or deamplifies) the signal received from the summing circuit 35 to an extent that the desired input amplitude will be set by controlling the vibrator 25 through a power stage 37. Finally, the amplitude controller 36 sets the output signal of the summing device 35 to the value "UrefC", which, at the same time, results in that the output voltage amplitude of the input stages 40 and 41 will also be stabilized. The value "UrefC" is chosen so that the measuring ranges of the digital-analog converters 46 and 47 may be used as far as possible.

The sensors 27 and 28 supply analog signals that contain the signals generated by the Coriolis-force in opposite phases; thus, the latter signal components are not present in the sum of the two signals but to an insignificant extent. By using the summed signal to control the vibrator 25, the flow conduits 14 and 15 will always be vibrated at their resonance frequencies. In addition to a reduced driving power requirement, this method also involves the advantage that the accuracy of density measurement will be improved due to the fact that the value of resonance frequency is used in density calculation.

Figure 3:
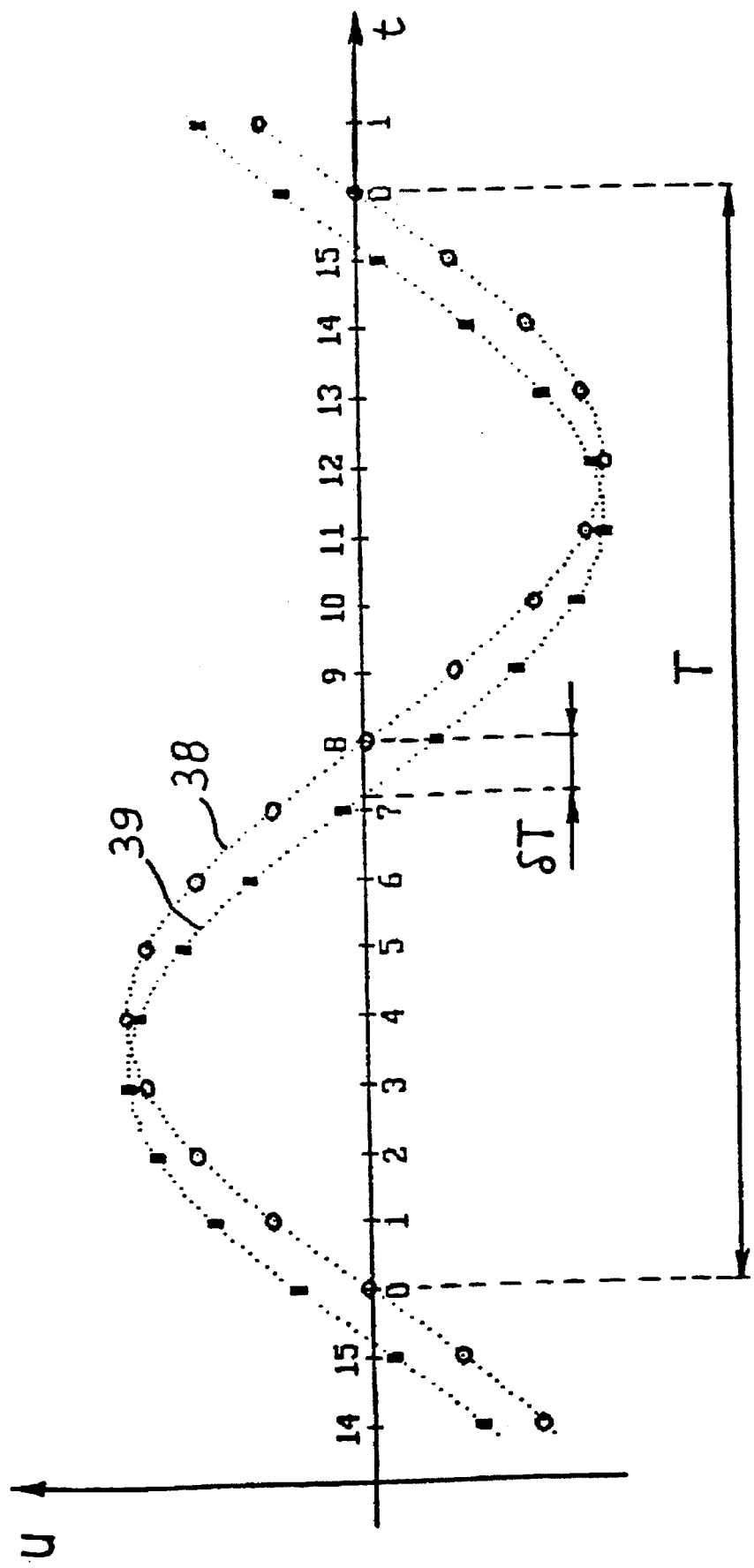
FIG. 3 is a diagram showing the sampling of two analog signals generated by two sensors according to the invention.

In the following the method of processing the signals of the apparatus according to the invention by using Fourier transformation will be explained. Reference is made to FIG. 3 where voltage signal UA denoted by reference number 38 and voltage signal UB denoted by reference number 39 are shown.

By vibrating the flow conduits 14, 15 of a mass flow meter, periodic voltages of the same frequency will be induced in the sensors 27, 28. The measuring task consists in an accurate measurement of the time lag between the two signals UA and UB. The periodic voltage signals UA and UB can be expanded into Fourier series. The Fourier series can be of arbitrary length, however, due to the fact that the frequency of the Coriolis force is equal to that of the driving force, it is sufficient to use the series relating to the fundamental frequency:

$$UA(\omega \cdot t) = a01 + a1 \cdot \cos(\omega \cdot t) + b1 \cdot \sin(\omega \cdot t) \tag{1}$$

$$UB(\omega \cdot t) = a02 + a2 \cdot \cos(\omega \cdot t) + b2 \cdot \sin(\omega \cdot t) \tag{2}$$

where
UA, UB Fourier series of fundamental frequency of the two voltage signals supplied by the two sensors;
a01, a02 DC components;
a1, a2 Fourier coefficients of the cosinus-term;
b1, b2 Fourier coefficients of the sinus-term.

The DC components of the signals of the sensors 27, 28 carry no information, therefore, it is not necessary to be calculated. Equations (1) and (2) can be rewritten in the form as follows:

$$UA(\omega \cdot t) = CA \cdot \sin(\omega \cdot t + \phi A) \quad (3)$$

$$UB(\omega \cdot t) = CB \cdot \sin(\omega \cdot t + \phi B) \quad (4)$$

where $$CA = \sqrt{a1^2 + b1^2} \; ; \quad (5)$$

$$CB = \sqrt{a2^2 + b2^2}$$

CA, CB peak-value of signals UA and UB $$tg\phi A = \frac{a1}{b1} \quad (6)$$

$$tg\phi B = \frac{a2}{b2}$$

From the equation (6):

$$\phi A = \text{arctg} \frac{a1}{b1} \quad (7)$$

$$\phi B = \text{arctg} \frac{a2}{b2}$$

where

φA, φB phases of signals UA and UB.

In the case of mass flow signal processing, it is the time difference δT between the two signals UA and UB from the two sensors 27, 28 that carry the necessary information. This time difference δT can be calculated by using the two phase angles and the period:

$$\delta\phi = \phi A - \phi B \quad (8)$$

$$\delta t = T \cdot \frac{\delta\phi}{2 \cdot \pi}$$

where

δφ phase difference between the signals UA and UB from the two sensors 27, 28;

δt time difference between the signals UA and UB;

T time period of the signals UA and UB.

For the purpose of subsequent signal processing, it is recommended to filter the time difference values δt by means of digital filter, which enable the deviation of measuring results to be reduced.

When using the method described, the Fourier coefficients a1, b1, a2, b2 used in the equation (6) shall be determined. These coefficients can be determined by using the approximative harmonic analysis. For this purpose, the periodic function shall be divided into 2·n equal parts. Due to the binary representation used in digital computers, it is recommended to perform the decomposition by powers of 2. In selecting the number of parts, it shall be taken into account that a small number of parts involves a rough resolution in the results. On the other hand, large number of parts will be limited by the time necessary for the calculation of measuring results. Taking these aspects into consideration, the decomposition into 16 parts seems to be sufficient, which is shown in FIG. 3. The Fourier coefficients shall be determined by using the method of least squares. By omitting detailed explanation, the equations to calculate the Fourier coefficients are as follows:

$$a1 = \frac{2}{16} \cdot \sum_{i=0}^{15} UAi \cdot \cos\left(2 \cdot \pi \cdot \frac{i}{16}\right) \quad (9)$$

$$b1 = \frac{2}{16} \cdot \sum_{i=0}^{15} UAi \cdot \sin\left(2 \cdot \pi \cdot \frac{i}{16}\right) \quad (10)$$

$$a2 = \frac{2}{16} \cdot \sum_{i=0}^{15} UBi \cdot \cos\left(2 \cdot \pi \cdot \frac{i}{16}\right) \quad (11)$$

$$b2 = \frac{2}{16} \cdot \sum_{i=0}^{15} UBi \cdot \sin\left(2 \cdot \pi \cdot \frac{i}{16}\right) \quad (12)$$

where

UAi, UBi voltage values of signals UA ans UB measured at the time i.

For the calculations, the voltage of both signals shall be measured at equal intervals. For the generation of equal intervals, a reference oscillator is needed, which operates at a frequency equal to 16-times of the frequency of the input signal. The time period of the reference oscillator determines the sampling time for both input signals. The coefficients of the Fourier series shall be calculated by using the equations (9) to (12).

The present invention may be embodied in other specific forms without departing from the spirit or essential attributes thereof and, accordingly, reference should be made to the appended claims, rather than to the foregoing specification, as indicating the scope of the invention.

We claim:

1. A Coriolis type apparatus for measuring mass flow of a fluid stream, comprising:

at least one flow conduit which is oscillated at a resonant frequency transverse to the direction of flow while said fluid flows therethrough, two sensors for generating two analog signals corresponding to the motion of said flow conduit, two incremental type analog-digital converters for converting said analog signals into series of digital signals, each of said incremental type analog-digital converters comprising a comparator, an up-down counter and a digital-analog converter, a common clock signal source for driving said up-down counters of said two incremental type analog-digital converters, means for computing from said series of digital signals a value corresponding to a time difference between said analog signals by using Fourier transformation, controlled latches for forwarding said series of digital signals to said computing means, and control means for controlling said latches in synchronism with at least one of said analog signals.

2. The apparatus according to claim 1 wherein said control means comprises a comparator having an input connected to one of said analog signals, a phase detector, a low pass filter and a voltage controlled oscillator connected in series, an input of said phase detector being connected to an output of said comparator, further comprise a binary divider connected to an output of said voltage controlled oscillator, said binary divider having an output connected to another input of said phase detector.

3. The apparatus according to claim 1 wherein each of said incremental type analog-digital converters is designed so that $$LSB/T \geq 2 \cdot \sqrt{2} \cdot \pi \cdot U \cdot f,$$

where LSB is the least significant bit of the up-down counter, T is the time period of the clock signal of said clock signal source, U is the r.m.s. value of the greater one of said analog signals, and f is the frequency of said analog signals.

4. The apparatus according to claim 1 further comprising vibrating means for oscillating said at least one flow conduit, said vibrating means being driven by a signal which is in phase with the sum of said analog signals.

* * * * *